July 8, 1958 W. G. BALDWIN 2,841,881
LEVEL UNIT
Filed Sept. 23, 1954 2 Sheets-Sheet 1

INVENTOR.
WILLIAM G. BALDWIN.
BY
Christy, Parmelee and Strickland.
ATTORNEYS.

July 8, 1958 W. G. BALDWIN 2,841,881
LEVEL UNIT
Filed Sept. 23, 1954 2 Sheets-Sheet 2
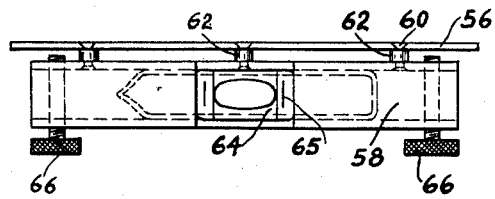
Fig. 9.
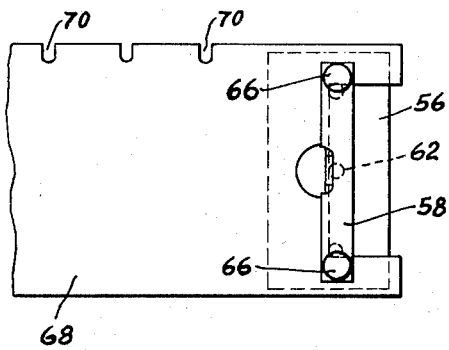
Fig. 10.
Fig. 7.
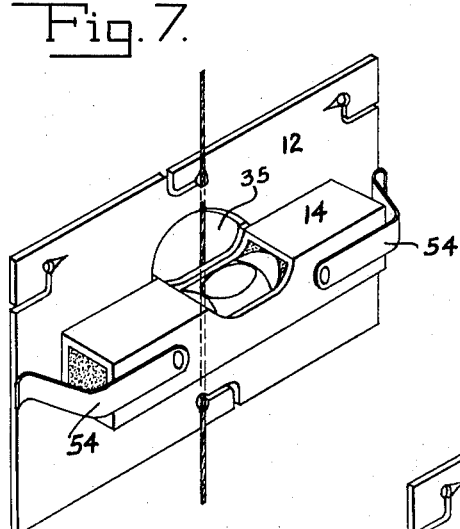
Fig. 8.
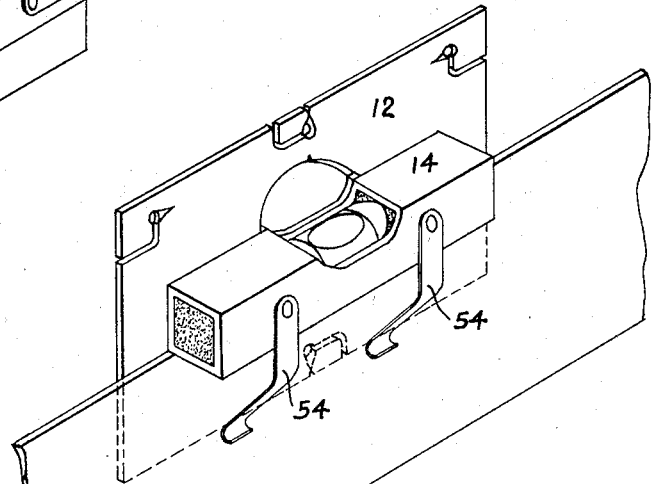
INVENTOR.
WILLIAM G. BALDWIN.
BY
Christy, Parmelee and Strickland
ATTORNEYS.

United States Patent Office 2,841,881
Patented July 8, 1958

2,841,881

LEVEL UNIT

William G. Baldwin, Wilkinsburg, Pa.

Application September 23, 1954, Serial No. 457,879

7 Claims. (Cl. 33—207)

This invention relates to a level unit for mechanics or surveyors for use with a straight edge and plumb line to determine or locate vertical and horizontal points or surfaces, and is a continuation in part of my application (forfeited) Serial No. 213,952, filed March 5, 1951, and which was copending with my application Serial No. 213,951, filed March 5, 1951, and now issued as Patent No. 2,637,912, dated May 12, 1953.

The well-known mechanic's spirit level is commonly used by carpenters, masons and technicians to adjust or position surfaces of structures such as door and window frames and walls, with reference to true vertical and horizontal planes. The conventional level is generally confined to these two uses on account of the construction of the level. The level consists usually of a comparatively thick frame or body (one to two inches thick) in which bubble tubes are mounted midway between the face of the frame. Such levels, due to the thickness and size of the frame, have little flexibility to adapt it for other than the above-mentioned uses.

The carpenter's level for example has little utility for projecting points in a vertical direction, but a plumb bob is often used for this purpose. A plumb bob to be accurate must always be hung from an overhead support so that points cannot be projected upwardly as from the floor to the ceiling. A mechanic cannot hold the line of a plumb bob on a ceiling or superstructure while at the same time positioning the plumb bob over a point on the floor. The plumb bob when suspended from an overhead structure freely swings like a pendulum to seek the vertical position, and it is often very annoying to bring the plumb bob over a definite point in a location which is windy or has other disturbances. To hold the plumb bob over a point on the floor while trying to locate a point in a vertical plane three feet above the floor is a very difficult operation.

I have discovered that an appropriately mounted spirit level can have greater utility and convenience than the present spirit level or the plumb bob. For example, a properly arranged spirit level unit may be used for plumbing and for leveling, and points can be projected either upwardly or downwardly with the level unit. The plumb line may be attached at a point on the ceiling or the floor and it is merely necessary to mount the level unit on the line in a convenient position for observation in order to locate a point in a vertical plane several feet below the ceiling or several feet above the floor. In making such a point location, it is not necessary for the mechanic to wait for a plumb bob to become centered over a point, but the line with the level unit thereon is stretched and moved slowly until the level bubble comes to central position. If a point is to be located on a surface vertically above a point at the bottom of the surface, the plumb line is attached at the bottom point and the line with a level unit thereon above the point to be located with the level tube positioned parallel to the surface, is moved until the bubble indicates level, whereby the line will be over the vertical point. The use of such a leveling unit leads to an amazing increase to the utility of the spirit level. Further, the level unit may be made in a small compact form which can be simply calibrated. Further, such a level unit will permit the technician to perform the functions of both a level and a plumb bob with great accuracy and at the same time avoid the inconvenience of a level and plumb bob. Further, the spirit level tube may be mounted on a comparatively thin backing plate so that the level unit may be positioned very close to the work being adjusted and assist in readily locating points on the work.

The primary object of the present invention is to provide a level unit of unique construction in which the spirit level tube is positioned on one side of a comparatively thin straight edge plate and arranged to be suspended on a plumb line for making both vertical and horizontal terminations and measurements.

Another object of the invention is to provide a level unit which may be mounted on a straight edge square or other tool for use in making leveling and plumbing determinations.

While my prior Patent No. 2,386,833, dated October 16, 1945, contemplated provision of a level that could be used on a plumb line, it has certain drawbacks to the extent that the line receiving openings are so constructed that the instrument slips too freely on the line and also too much of the mass of the instrument is to one side of the line, and the line holding plate is separable from the level. An object of the present invention is to provide an instrument which is more convenient to use, more accurate, more versatile, and less expensive than the device shown in my said patent, and which constitutes an improvement thereover.

With these and other objects in view, the invention consists in the level unit and a separable straight edge as hereinafter described and particularly defined in the claims.

The various features of the invention are illustrated in the accompanying drawings, in which:

Fig. 7 is a perspective view of the level unit shown in Fig. 5 which is applied to a plumb line;

Fig. 8 is a perspective view of the level unit of Fig. 5 which is attached to a straight edge;

Fig. 9 is a top plan view of a third form of level unit which is designed for use with a straight edge for leveling and plumbing; and Fig. 10 is a side elevation of a portion of a straight edge illustrating the mounting of the level unit of Fig. 9 on the straight edge for use in plumbing and leveling.

Figure 1:
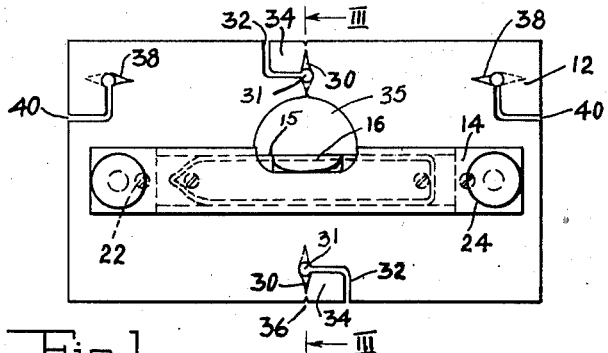
Fig. 1 is a front elevation of a leveling and plumbing unit embodying the preferred form of the invention.
Figure 3:
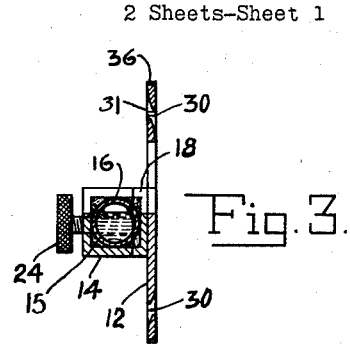
Fig. 3 is a vertical sectional view of the level unit taken on the line III—III of Fig. 1.
Figure 2:
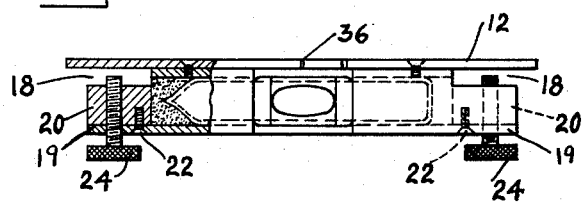
Fig. 2 is a top plan view with parts shown in section of the level unit shown in Fig. 1.

The level unit illustrated in Figs. 1, 2 and 3 comprises a thin metal plate 12 formed preferably of aluminum, and of rectangular shape. Mounted on one face of this plate is a metal tube or shell 14 which is of square section, and its longitudinal axis is parallel with the horizontal center line of the plate, and a transparent sealed bubble tube 15 is fitted into the tube 14, its ends being set in plaster so that the bubble 16 in the tube 15 will be centered when the axis of the plate 12 is horizontal. The metal tube 14 has the central portion of its top and part of its sides at the center cut away to expose the mid portion of the bubble tube. The top of the bubble tube is at about the horizontal center line of the plate. The side walls and top wall of the metal shield or holder 14 are cut back from the end of the tube so that the bottom wall (as viewed in Fig. 2) projects beyond the other walls of the tube as indicated at 19, and have filler blocks 20 secured thereto by screws 22, the blocks being of such thickness as to provide a space 18 between the inner face of the block 20 and the plate 12. A knurled thumb screw 24 is screwed through each of these projecting ends 19 and filler blocks 20. The spaces 18 provide notch-like recesses into which a metal plate or strip may be inserted, as for example a straight edge, or they may be used in the manner hereinafter more fully described, the screws 24 constituting clamping screws to clamp the instrument to the plate on or in which it is supported.

Figure 4:
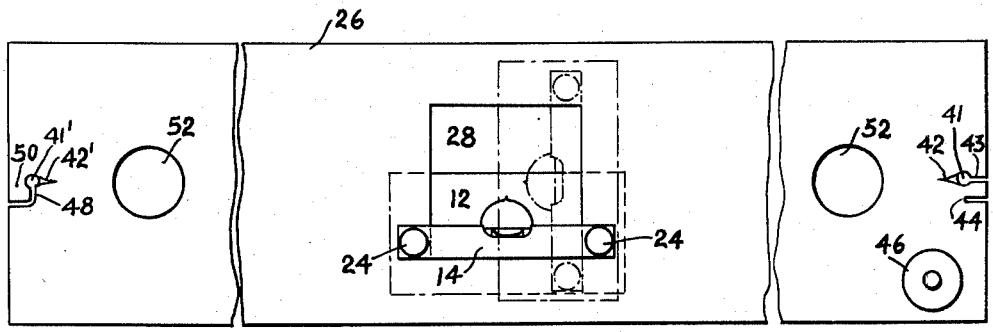
Fig. 4 is a view in side elevation of a preferred form of straight edge with the level unit shown in Fig. 1 attached thereto.
Figure 5:
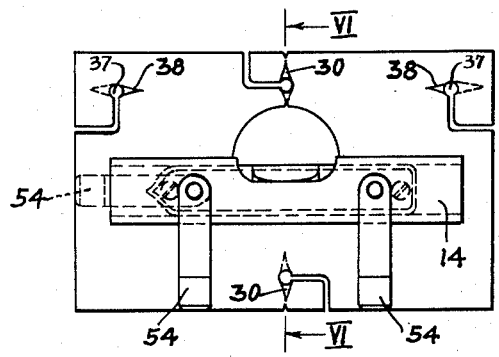
Fig. 5 is a view in front elevation of a modified form of level unit which has clips for attaching it to a straight edge plate.
Figure 6:
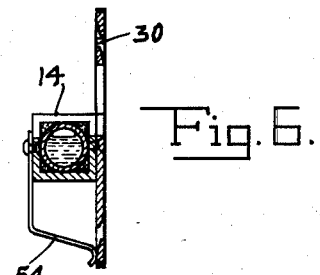
Fig. 6 is a vertical sectional view of the level unit taken on the line VI—VI of Fig. 5.

A straight edge particularly adapted for use with the level unit shown in Figs. 1, 2 and 3 is shown in Fig. 4. This straight edge 26 has a square opening 28 in the central portion thereof, the dimension of the opening 28 being equal to the length of the tube 14 between the inner ends of the notches 18. It is of a thickness to snugly fit in the recesses 18, being nearly equal to the width of these recesses. With this construction the tube 14 may be passed through the opening 28 while the level unit is in a diagonal position with reference to the square opening, and turned so that the level unit will rest in the bottom of the square opening as illustrated in full lines in Fig. 4, in which position the straight edge and level unit may be used for leveling purposes. It is to be understood that the bottom and top of the square opening 28 are parallel to the straight edges of the plate 26, and the sides of the square opening 28 parallel to the ends of the plate 26 are perpendicular to the straight edges of the plate. When the level unit is mounted in the opening 28 in the position shown in dot-and-dash lines, the straight edge may be used for either leveling or plumbing.

As shown in Figs. 1 and 2, openings 31 are formed in the plate on the exact vertical center line of the plate, the hole in the top effectively sloping from the tube-carrying face of the plate downwardly, and the other hole effectively sloping in the opposite direction. The tube-carrying face of the plate has a downwardly-widening and deepening V-shaped groove leading from near the edge of the plate to the hole, and the same face at the bottom has a similarly arranged upwardly widening and deepening groove 30. On the opposite face of the plate are similar grooves which are reversed in direction, i. e., they point toward the center line of the plate. As shown in Fig. 3, this in effect forms the hole 31 as a straight through opening with oppositely beveled edges at the top and bottom of the hole. Leading from the top edge of the plate from one side of the vertical center line vertically and then laterally to the hole is an L-shaped or bayonet slot 32. A similar but reversed slot 32 leads to the bottom hole. 34 designates a peninsula-like body of metal formed by such slots at the top and bottom. Marks or nicks 36 are formed in the top and bottom edges of the plate at the exact vertical center line.

To use the instrument for plumbing, a line is attached, for example, to the floor or ceiling of a structure, and this line is hooked through the bayonet slots 32 into the openings 31 as shown in Fig. 7, being passed through the openings so that where the string or line crosses the bubble tube it will be on the side of the plate opposite the bubble tube, hereinafter for convenience called the back face, while the face with the tube is referred to as the front face.

As the string is pulled taut, the line will bind in the openings 31 and will automatically be guided by the V-shaped grooves 30 into coincidence with the vertical center line of the plate. This condition may be accurately seen in using the tool because of the indicating notches 36. The binding effect of the instrument on the string enables it to be moved up and down by the application of light force, but it will not freely slide and it cannot tilt or cant endways because of the V-shaped grooves. The oppositely-beveled edges of the holes give good holding power against slippage, an important advantage for example where a workman on a ladder is "plumbing" from the floor to an overhead position on the ceiling.

The plate has an opening 35 therethrough in the area of the exposed portion of the bubble tube, and since the string at the back of the plate is in very close proximity to the bubble tube and passes directly midway between the markers on the bubble tube defining the central position of the bubble, quick and accurate plumbing is facilitated, whether the workman looks down on the tube or views the bubble from either face of the instrument.

The plate is very light and the position of the bubble tube is below the axis of the plate so that the center of gravity of the plate is below the longitudinal axis and the plate will hang in a vertical plane.

The plate 12 is also provided with openings 37 formed exactly like the openings 31, except that they pass diagonally in opposite slopes horizontally through the plate, one hole being located near each end of the plate between the top edge and the horizontal center line. Bayonet or right-angle slots 40 lead from the ends of the plate horizontally and then vertically upwardly into the respective holes, and there are oppositely arranged V-shaped grooves 38 which are in all respects the counterparts of grooves 30, but which point horizontally instead of vertically. This enables the instrument to be hooked onto a horizontally-extending string or line, and when the line is drawn taut it will, because of the grooves, make the string assume a position exactly parallel with the axis of the bubble tube. Here, again, because of the center of gravity being low, the plate 12 will hang in a vertical plane.

The straight edge 26 is provided with grooves 42 in the central longitudinal axis of the plate at each end of the plate. A slot 43 communicates with the opening 41 and grooves 42 (similar to grooves 42) on the right-hand end of the plate (Fig. 4) and another slot 44 permits a line which is located in the groove 42 to pass through the slot 43 and up through the slot 44 and up to a line holder 46. A right angle slot 48 is formed in the plate communicating with the opening 41' and groove 42' (similar to opening 37 and grooves 38) at the left-hand end of the plate to provide a bridge 50 over which the cord attached at 46 may be passed along the front edge of the plate, then through the slot 42 and around the bridge. The openings 41 and 41' are centered on the longitudinal center line of the plate 26 and the points of the grooves 42 and 42' are on this line. In this way, the straight edge may be suspended vertically from a plumb line, and with a level unit in the position shown in dot-and-dash lines, in Fig. 4, may be used for plumbing purposes, especially where more weight is desired than that provided by the device shown in Fig. 1 is used alone. Furthermore, with a line mounted in the grooves 42 a level unit similar to that shown in Fig. 1 may be suspended on the line through the grooves 30 and the level unit moved up and down the cord to any desired position. Openings 52 may be located along the face of the straight edge by which the bubble in a tube suspended on the cord may be observed from the back face of the straight edge.

The level unit shown in Figs. 5, 6, 7 and 8 is similar in construction to the unit shown in Figs. 1 and 2. In place of the knurled thumb screws for fastening the level unit to a straight edge, spring clips 54 are pivotally mounted on the front face of the tube holder 14 and may be turned down into the position illustrated in Figs. 6 and 8 to clamp the level unit upon a straight edge. The unit illustrated in Figs. 5, 7 and 8 has openings and notches for engagement with a line, as previously described. As illustrated in Fig. 7, the spring clips 54 may be moved into position over the ends of the tubes 14 when they are not to be used for clamping the level unit to a straight edge, a square or other surface on which the level unit is to be used.

In Figs. 9 and 10 a third form of level unit is illustrated, which consists of a thin plate 56 with a rectangular tube 58 attached to the front face of the plate by means of pins 60 and spacers 62. The lower faces of the spacers are mounted in a line which is parallel to the longitudinal axis of the plate, and a bubble tube 58 has the bubble surface mounted parallel to the longitudinal axis of the plate 56. The spacers 62 preferably have a thickness greater than the thickness of a metal square or straight edge on which the unit is to be mounted, and when the level unit is in position, the unit may be clamped to the straight edge by means of knurled screws 66 which are threaded through each end of the tube 58.

In Fig. 10 is illustrated a straight edge plate 68 which has a series of notches 70 formed therein in spaced relation, which is the same as the spaced relationship of the spacers 62 in the level unit. The bottom of each notch 70 is in a line parallel to the longitudinal axis of the straight edge plate 68, so that when the level unit is mounted in the notches, the bubble of the level tube will be parallel to the longitudinal axis of the plate. In this manner the plate may be used for leveling. Preferably the notches 70 would be in the central portion of the plate, or a series of notches may be located along an edge of the plate to allow the level unit to be mounted in different positions along the plate. A series of notches similar to 70 may be formed in the end of the plate 68, and a unit mounted in the notches to hold the plate in position by means of screws 66 as illustrated in Fig. 10, to provide a mounting of a level tube at right angles to the axis of the plate. A plate with a level unit mounted as illustrated in Fig. 10 can be used for plumbing purposes.

The level unit illustrated in Fig. 9 may be provided with notches similar to notches 30 and 38 of Fig. 1, so that the unit may be used with a plumb line for leveling and plumbing. Further, by positioning the outside faces of the outside spacers 62 a distance apart equal to the distance between the inner ends of the notches 18 in the tube 14, the unit of Fig. 9 may be positioned in the square opening 28 of the straight edge 26 to be used with the straight edge for leveling and plumbing.

The level units such as illustrated in Figs. 1 to 8 inclusive are preferably made with a backing plate of thin metal which is light-weight and can be easily handled and held in suspended position on a cord for leveling, or can be easily moved up and down a plumb line for plumbing the surfaces. The indicating marks on the plate are very useful in locating points. The rectangular tube is very useful in supporting the unit in position on surfaces which are short, and for mounting the level unit on straight edges. Preferably the level unit is made of light-weight metal such as aluminum, magnesium, or magnesium alloys.

The three forms of leveling units illustrated and described above may be advantageously used by a surveyor in determining the horizontal distance between two points located, for example, on the side of a hill. By means of a transit, a series of stakes may be positioned along the line, the distance of the stakes apart depending upon the steepness of the incline between the two points. After the stakes have been set and points on the stakes made, two chain men can determine the horizontal distance between the stakes wherein one chain man will hold the end of a measuring chain on the stake of highest elevation, and another chain man can use a leveling unit mounted on the plumb bob line with the chain on top of the tube 14 and hold the plumb bob over the point on the stake of lowest elevation while moving the leveling unit up and down on the plumb line until the leveling tube with the chain on top thereof indicates a level position. Then the position of the plumb line on the measuring line will be the horizontal distance between the stakes. This operation can be repeated with reference to the distance between each or the stakes and the total horizontal distance between the stakes will be the sum of the horizontal distances between the individual stakes.

In Fig. 9, there is illustrated the use of the well-known calibrated spirit bubble tube 64 having a series of graduations 65. The tube 64 is calibrated so that the position of the bubble with reference to the graduations will indicate the extent of deviations of surfaces from true vertical or horizontal planes. Such a tube may be used in any of the other forms.

Since the plate in all cases is a true rectangle with parallel long straight edges and square ends, it may be used as any level by placing one edge or the other on a horizontal surface or placing either end against a vertical surface. The square tube holder 14 in all forms is also accurately formed and positioned so that its top and bottom faces are parallel with the edges of the plate so that the member 14 may be rested on a surface to determine if it is level. This is often very useful in close quarters.

The preferred form of the invention having been thus described, what is claimed as new is:

1. A leveling instrument comprising a bubble tube, a housing of square section in which the bubble tube is carried, the top and bottom surfaces of the housing being flat and being parallel, the top surface having an opening therein through which the bubble tube is exposed to view, and a thin flat metal plate secured against one side wall of the housing having parallel top and bottom edges which are also parallel with the top and bottom surfaces of the housing and ends which are square with the top and bottom edges, the plate being at least as long as the housing, said plate being thin as compared to the section of the bubble tube housing and being several times wider than said section so as to extend above and below the housing, the housing being centered between the ends of the plate, the top and bottom edges of the plate having cord-receiving slits therein, each having cord-retaining notches at its inner end located on the vertical center line of the plate and tube housing so that a cord may be received in and stretched across the center of the instrument at the center of the bubble tube, the plate having an opening therethrough in the mid portion thereof through which the bubble tube may be viewed from the opposite side of the plate.

2. A leveling instrument as defined in claim 1 in which the housing is provided with means adjacent each end for releaseably clamping the instrument to a supporting structure.

3. A plumbing and leveling instrument as defined in claim 1 in which the tube housing has overhanging end elements spaced from the plate, and a thumb screw passing through each of said overhanging end elements whereby a straight edge may be clamped between the holder and the plate.

4. A plumbing and leveling instrument as defined in claim 1 in which the tube housing has overhanging end elements spaced from the plate, and a thumb screw passing through each of said overhanging end elements and a straight edge having a square opening therethrough having a diagonal dimension sufficient for the tube and housing assembly of the instrument to be passed therethrough and of such dimension that when the tube and housing assembly is squared around after being passed through the opening, the marginal portions of the straight edge round the opening will be engaged between the plate of said instrument and said overhanging end elements.

5. A plumbing and leveling device comprising a rigid, thin metal plate of rectangular shape having straight and parallel longitudinal edges, a square tubular bubble tube holder having a bubble tube therein secured to one face of the plate parallel with the longitudinal axis of the plate and projecting from said face, the bottom surface of the tube holder also forming a straight edge, said holder with its tube having a length less than the overall length of the plate, and a pair of spring fingers pivotally secured to the tube holder near each end, said spring fingers having terminal portions which bend in toward the plane of the plate, said fingers being movable from a position where they are parallel with the tube holder to an operating position where they are at right angles to the tube holder and the terminals are adjacent the lower edge of the plate.

6. A level unit comprising a thin metal backing plate, a square metal tube fixed to the plate with a flat face against the face of the backing plate, said backing plate having a width more than three times the width of the tube, and the longitudinal axis of the tube being mounted adjacent and parallel with the center longitudinal axis of the plate, a bubble tube positioned in the square tube parallel with the longitudinal axis of the plate and the longitudinal center of the bubble tube lying in a mid plane passing at right angles to the plate longitudinal axis, said plate and square tube being cut away at their central portions to expose the bubble from either side of the plate, plumb line notches in openings positioned closely adjacent the top and bottom edges of the plate arranged to center a plumb line in the notches in said transverse plane, narrow portions of the side wall of the square tube being cut out adjacent the plate at each end of said square tube to form recesses, and a straight edge having a thickness substantially equal to the width of said recesses and having a rectangular opening of sufficient dimension to permit the square tube to pass therethrough and to position the end walls of the opening within said recesses, the transverse sides of the opening being at right angles to the outer edges of the straight edge, and clamping screws mounted in the ends of the square tube to clamp the plate and tube against a face of the straight edge.

7. The combination defined in claim 6 in which the opening is formed in the straight edge plate with boundary portions of the opening being arranged to position the bubble tube with the bubble longitudinal axis of the bubble tube paralled selectively to either the longitudinal or transverse axis of the straight edge plate for leveling and plumbing.

References Cited in the file of this patent

UNITED STATES PATENTS

| | | |
|---|---|---|
| 767,188 | Warner | Aug. 9, 1904 |
| 812,449 | Potter | Feb. 13, 1906 |
| 1,241,341 | Chambers | Sept. 25, 1917 |
| 1,845,801 | Kupferman | Feb. 16, 1932 |
| 2,113,993 | McLaughlin | Apr. 12, 1938 |
| 2,170,824 | Lichtenwalner | Aug. 29, 1939 |
| 2,386,833 | Baldwin | Oct. 16, 1945 |
| 2,569,727 | Mehaffey | Oct. 2, 1951 |